(12) United States Patent  
Egger

(10) Patent No.: US 8,389,112 B2  
(45) Date of Patent: Mar. 5, 2013

(54) METHOD FOR PRODUCING A COMPOSITE PANEL

(76) Inventor: Karlheinz Egger, Mils (AT)

( * ) Notice: Subject to any disclaimer, the term of this patent is extended or adjusted under 35 U.S.C. 154(b) by 545 days.

(21) Appl. No.: 11/989,510

(22) PCT Filed: Jul. 18, 2006

(86) PCT No.: PCT/AT2006/000304
§ 371 (c)(1),
(2), (4) Date: May 5, 2009

(87) PCT Pub. No.: WO2007/012095
PCT Pub. Date: Feb. 1, 2007

(65) Prior Publication Data
US 2009/0214878 A1    Aug. 27, 2009

(30) Foreign Application Priority Data

Jul. 25, 2005  (AT) .................................. 1244/2005

(51) Int. Cl.
*B32B 3/24*    (2006.01)
*B32B 17/10*   (2006.01)
*B32B 27/04*   (2006.01)

(52) U.S. Cl. ...................... 428/317.9; 428/325; 428/426

(58) Field of Classification Search .................. None
See application file for complete search history.

(56) References Cited

U.S. PATENT DOCUMENTS

| 2,582,132 | A | * | 1/1952 | Kaphan ........................... 428/51 |
| 3,449,184 | A | * | 6/1969 | Balk ............................. 156/105 |
| 3,558,422 | A |   | 1/1971 | Hamilton et al. |
| 4,463,053 | A |   | 7/1984 | Brinegar |

FOREIGN PATENT DOCUMENTS

| BE | 906 123 | 4/1987 |
| DE | 14 46 858 | 4/1969 |
| DE | 35 33 463 | 4/1987 |
| DE | 100 00 966 | 7/2001 |
| EP | 0 271 288 | 6/1988 |
| EP | 0 361 872 | 4/1990 |
| EP | 0 403 444 | 12/1990 |
| GB | 1 179 833 | 2/1970 |
| GB | 1 600 867 | 10/1981 |
| GB | 2 116 879 | 10/1983 |
| WO | WO 2004/033198 | 4/2004 |

* cited by examiner

*Primary Examiner* — Ramsey Zacharia
(74) *Attorney, Agent, or Firm* — Cozen O'Connor

(57) ABSTRACT

A method for producing a panel made of a composite material of substantially three layers including a first cover layer and a second cover layer, at least one of which cover layers is made of glass, and an intermediate layer of a synthetic resin, into which a decorative material which differs from the synthetic resin has been embedded. The method comprises the steps of providing a mesh having an upper side covered with discrete particles, adhering the underside of the mesh to a surface of the first cover layer, applying a liquid synthetic resin to the discrete particles and the mesh, applying the second cover layer on the liquid synthetic resin while the edges are sealed, and curing the liquid synthetic resin.

4 Claims, 1 Drawing Sheet

METHOD FOR PRODUCING A COMPOSITE PANEL

RELATED APPLICATION

This is a U.S. national stage of application No. PCT/AT2006/000304, filed on Jul. 18, 2006.

This application claims the priority of Austrian Patent application no. 1244/2005, filed Jul. 25, 2005, the entire subject matter of which is hereby incorporated by reference.

FIELD OF THE INVENTION

The invention relates to a method for producing a panel made of a composite material of substantially three layers, which has at least one cover layer of glass, as well as an intermediate layer of a synthetic resin, into which a decorative material which differs from the synthetic resin has been embedded.

BACKGROUND OF THE INVENTION

Composite glass panels are known, which are designed as safety glass and/or have a decorative character. Solids consisting of noble or base metals, gold foil, stones, glass, wood, plastic materials, etc. are introduced into the intermediate layer of synthetic resin. The decorative material can also be liquid or gaseous. It is also possible to mix various color pigments with the synthetic resin. However, this should not be considered to be decorative material in the present case.

The decorative materials can be arranged in the form of inserts or enclosures in the synthetic resin layer. In the case of solid material inserts, the synthetic resin layer constitutes the matrix for the solid material inserts, which can be differently shaped, for example as grains, in the shape of small plates, or threads. Gaseous enclosures in the synthetic resin layer can be constituted by air bubbles.

SUMMARY OF THE INVENTION

One object of the invention is to provide a method for producing a composite glass panel with an intermediate layer, into which a solid, decorative, particle-shaped material has been integrated.

This and other objects are attained in accordance with one aspect of the invention directed to a method in which a two-sided adhesive foil is glued onto the underside of a mesh covered with discrete particles, preferably glass crystals, and the mesh is glued on the entire surface of a first flat cover layer. Liquid synthetic resin is applied to the discrete particles and the mesh, and then the cover layer is placed thereon, while the edges are sealed, and finally the synthetic resin is cured. It becomes possible by means of this embodiment to integrate particle-shaped enclosures, in particular glass crystals, into the composite glass in an area-covering manner.

In accordance with an alternative of the method of the invention, one or several discrete particles, preferably glass crystals, are applied to a first cover layer with the aid of an intermediate layer of liquid synthetic resin which covers the particles, and then the intermediate layer is cured after a covering glass panel has been placed thereon.

After the covering glass panel has been placed on it, the liquid intermediate layer of synthetic resin is preferably cured by means of UV radiation.

A panel of a composite material, which is substantially designed in three layers and has at least one cover layer of glass, as well as an intermediate layer of a synthetic resin, into which a decorative material with the features that the decorative material consists of one or several particles integrated into the intermediate layer has been embedded, is also an object of the invention.

Preferable applications of the composite glass in accordance with the invention are: shower partitions, bar paneling, bar counters, table tops, room dividers, discotheque floors, borders and tiles, glass furniture and its parts, parts of facades, and the like.

DETAILED DESCRIPTION OF THE DRAWINGS

Figure 1:
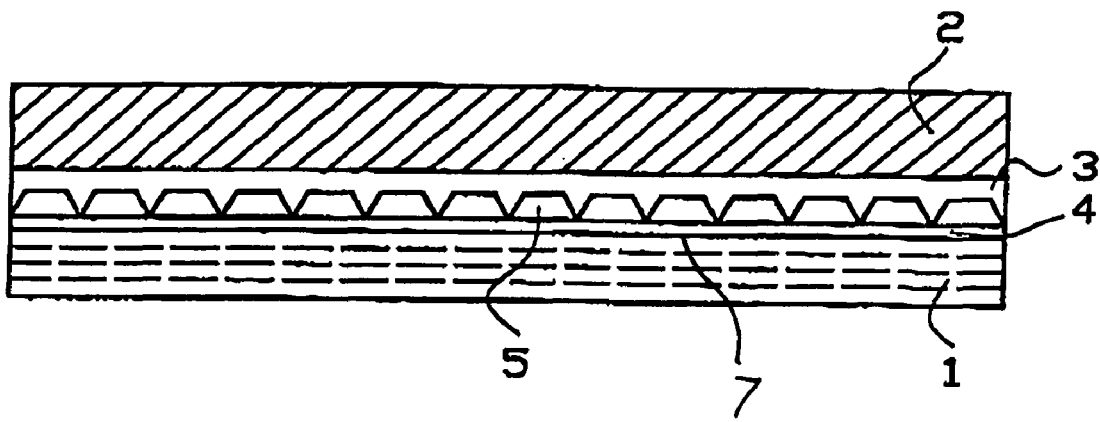
FIG. 1 shows a sectional view of a composite glass panel in accordance with a first embodiment of the invention.

FIG. 1 shows the structure of a composite glass panel in accordance with the invention. The panel has two cover layers 1, 2 and a synthetic resin layer 3, in particular of a polyester resin, which, in the finished product, is present in the cured state. A flat, regular mesh 4 with discrete particles 5, in particular glass crystals, has been embedded into the synthetic resin layer 3. Mesh 4 comprises webs forming particle holders. The terms "mesh" and "web" are used interchangeably herein. Any flexible aluminum mesh can serve. The particles are positively maintained in the form of inserts of various size and shape in holders of the web 4 which, for example, is made of aluminum. The holders of the web are connected with each other on all sides by strips. Finally, the composite panel also has a border, not represented, which is cut off at the end of manufacture.

The manufacture of the composite glass panel takes place in that the mesh 4, together with the discrete particles positively maintained on one side, is applied to the cover layer 1 at the bottom, made of glass, cardboard, plastic, etc., in that the underside of the web 4 is provided with a continuous layer, or a strip, of a two-sided adhesive foil 7, which adheres to the cover layer 1. The web 4 is very flexible, for example made of aluminum, and is movable to a limited extent in all directions, because the holders, which positively receive the individual discrete particles, are connected with each other on four sides merely by thin strips.

Then the synthetic resin, for example polyester resin, is mixed with the appropriate hardener and accelerator and is applied in the liquid state to the web with the discrete particles, wherein the layer thickness is selected to be of such a dimension that the particles are embedded into the synthetic resin material.

Then a cover glass panel 2 is applied with the aid of vacuum suction cups. The edges of the composite are sealed by means of a border, for example a self-adhesive aluminum strip in order to prevent the escape of the resin.

The unit consisting of the cover layer 1, the cover glass panel 2 and the resin layer 3, as well as the mesh 4 in the center, is horizontally stored for approximately 24 hours at room temperature. The resin cures during this time and the composite material panel in accordance with the invention results, whose glass cover panel can consist not only of silica glass, but also of a plastic glass, for example acrylic glass. The border is cut off after curing. However, curing by UV radiation is also possible.

Figure 2:
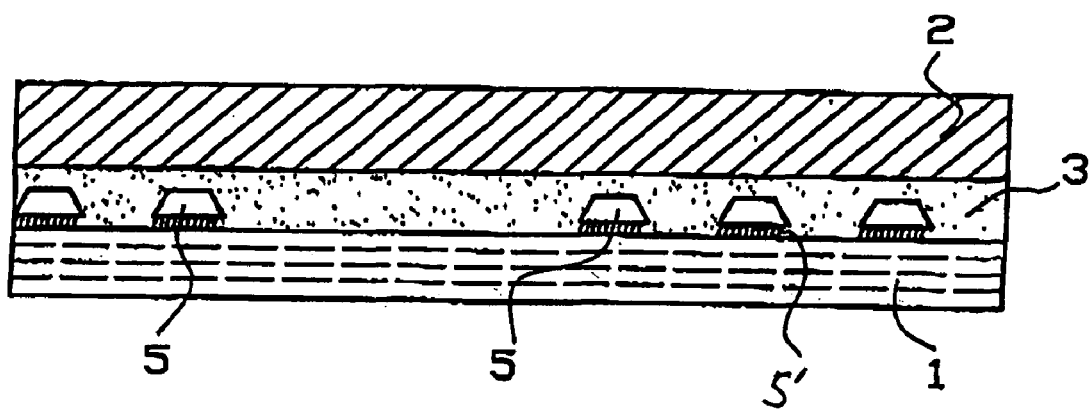
FIG. 2 shows a second embodiment in a sectional view.

In accordance with an alternative embodiment of the invention as shown in FIG. 2 one or several crystals 5, in particular made of glass, are applied to the lower cover layer 1, which can consist of various materials, such as glass, wood, metal, cardboard, etc., are fixed in their position, for example with the aid of an adhesive 5', and are surrounded by the intermediate layer 3 of liquid synthetic resin. Thereafter, following the placement of a cover glass panel 2 on the top, the synthetic resin layer is cured, for example by means of UV radiation. It is, of course, also possible to provide curing by means of storage.

The explained exemplary embodiments can be variously modified within the scope of the invention, in particular in regard to the design of the web and the discrete particles, which need not necessarily consist of ground glass crystals, but can also be made of metal, plastic, or the like.

The invention claimed is:

1. A panel of a composite material comprising:
   three layers including a first cover layer, a second cover layer, and an intermediate layer of synthetic resin, into a which a decorative material has been embedded, wherein the decorative material comprises at least one particle integrated into the intermediate layer, wherein at least one of the first and second cover layers is a cover layer made of glass, and wherein the at least one particle is supported by a web, which is glued onto the first cover layer.

2. The panel of a composite material in accordance with claim 1, wherein the particles are directly glued on the first cover layer.

3. The panel of composite material in accordance with claim 1, wherein an underside of the web is provided with a continuous layer, or a strip, of a two-sided adhesive foil, which adheres to the first cover layer to glue the web onto the first cover layer.

4. The panel of a composite material in accordance with claim 1, wherein the at least one particle comprises a glass crystal.

* * * * *